United States Patent [19]

Attallah

[11] Patent Number: 4,845,773
[45] Date of Patent: Jul. 4, 1989

[54] METHOD AND A SYSTEM FOR REMOTELY SWITCHING AN ELECTRICALLY OPERATED DEVICE BY THE USE OF SIGNALS GENERATED BY A TELEPHONE

[76] Inventor: Arnaldo Attallah, 831 Boul. St-Germain, Ville St-Laurent, Quebec H4L 3R7, Canada

[21] Appl. No.: 94,006

[22] Filed: Sep. 8, 1987

[51] Int. Cl.⁴ ............... H04M 11/00; G05D 23/19
[52] U.S. Cl. ........................ 379/102; 379/104; 379/373; 340/310 A; 340/825.64; 236/51
[58] Field of Search ............ 379/102, 104, 105, 373; 340/825.64, 310 A, 870.17; 236/51

[56] References Cited

U.S. PATENT DOCUMENTS

| | | | |
|---|---|---|---|
| 3,702,904 | 11/1972 | Bard | 379/105 |
| 4,284,126 | 8/1981 | Dawson | 236/51 |
| 4,682,648 | 7/1987 | Fried | 340/310 A |

FOREIGN PATENT DOCUMENTS

1594931  8/1981  United Kingdom ............... 379/102

Primary Examiner—Jin F. Ng
Assistant Examiner—Wing Fu Chan

[57] ABSTRACT

A switching system and a method of remote switching an electrically operated device by using calling signals generated by a telephone. A switching element is actuated by the system upon detecting a specific code of the calling signals generated by the telephone and validating a predetermined number of these calling signals. The calling signals are treated by a processing circuit which in turn conditions circuit elements to actuate the switching. More specifically, but not exclusively, the calling signals are sound signals generated by the telephone and the switching system is located in proximity to the telephone source whereby to receive the sound signals.

28 Claims, 8 Drawing Sheets

METHOD AND A SYSTEM FOR REMOTELY SWITCHING AN ELECTRICALLY OPERATED DEVICE BY THE USE OF SIGNALS GENERATED BY A TELEPHONE

BACKGROUND OF INVENTION

1. Field of Invention

The present invention relates to a switching system and a method of remote switching an electrically operated device and wherein the switching system is operated by using calling signals generated by a telephone, and more particularly, but not exclusively, using sound calling signals.

2. Description of Prior Art

Various types of electrical or mechanical switching devices are remotely operated by various methods such as transmitting specific signals recognized by a receiver to connect an electrical source to a device via a switch, or else by transmitting coded signals or by generating specific sounds recognizable by a receiver system. However, most of these systems require a specific transmitter device and receiver device, and are very limited as to their operating range, that is to say, the transmitter and receiver must be located within the predetermined distance. Usually, this distance is fairly short, such as for starting ignition systems of automobiles, etc. Another disadvantage of such prior art systems is that these are quite costly because of the need of transmitters and receiver systems.

It is also known, particularly with the use of alarm systems, to protect an enclosure, to automatically generate a specific code signal on a telephone line upon detection of an alarm condition, such code signal is connected to a central control station where an alarm code can be identified by decoding the signal. These signals are usually transmitted automatically with an automatic dialing system as soon as an alarm condition is detected. A disadvantage of these systems is that they are also costly in that the subscriber must pay a service charge for the use of the telephone lines as well as the usual cost of the call if a long distance call.

SUMMARY OF INVENTION

It is a feature of the present invention to provide a switching system for switching an electrically operated device and wherein the switching system is operated by remote control using the calling signals generated by a telephone.

Another feature of the present invention is to provide a switching system for switching an electrically operated device by dialing a specific telephone number and causing a predetermined first series of repetitive calling signals to take place followed by a dialing of a second series of repetitive calling signals.

Another feature of the present invention is to provide a switching system which utilizes telephone lines without the transmission of voice signals along the telephone transmission link whereby there is no cost to the user for the use of a long distance telephone link.

Another feature of the present invention is to provide a switching system which is remotely operated by the use of the signals generated by a telephone regardless if the telephone is utilized in a party-line arrangement where there are restrictions concerning the connection of any device to the telephone wires, and irrespective of the type of calling signals generated by the telephone device.

Another feature of the present invention is to provide a low stand-by supply current derived from a serial circuit connection without affecting the load to be switched by the serial connection link.

Another feature of the present invention is to provide a switching system which is remotely controlled by telephone signals and wherein the switching system is provided with a detector circuit for identifying a specific code of telephone calling sound signals before validating a predetermined number of such calling sound signals to determine if a switching function is to be performed or not.

Another feature of the present invention is to provide a method of remotely switching an electrically operated device by the use of sound signals generated by a telephone.

According to the above features, from a broad aspect, the present invention provides a switching system for switching an electrically operated device, and wherein the switching system is operated by remote control using the calling signals generated by a telephone. The switching system comprises switch means to enable the electrically operated device. Processing circuit means is provided for identifying the calling signals and operating the switch means upon accepting a specific code of the calling signals and validating a predetermined number of such calling signals.

According to a further broad aspect of the present invention, the switching system is operated by calling sound signals generated by the telephone.

According to another aspect of the present invention there is provided a switching system wherein the system further comprises an ambient temperature measuring circuit for sensing the temperature in one or more enclosures, and feeding temperature information signals to the processing circuit means whereby to control one or more temperature conditioning devices.

Another aspect of the present invention is to reduce energy loss by unnecessary operation of air conditioning systems, such as heaters or air cooling devices, which are often operated in an environment which is not occupied, such as is the case with a second residence or cottage.

A still further aspect of the present invention is to provide a switching system which can be automatically operated to actuate an air conditioning device for a predetermined time before a person is to occupy the space where the air is being conditioned.

Another aspect of the present invention is to provide a switching system for switching a temperature conditioning device by the use of long distance telephone lines without transmitting voice signals on the lines and without unhooking the telephone receiver being called, and wherein the temperature is automatically regulated.

According to a further broad aspect of the present invention, there is provided a method of remote switching an electrically operated device. The method comprises the steps of calling a predetermined telephone number of a telephone coupled to a switching system having processing circuit means for identifying a code of calling signals and validating a predetermined number of calling signals. The caller causes the telephone to generate a first series of repetitive calling signals followed by a delay period, and then further calls to generate a second series of repetitive calling signals to cause the processing circuit means to validate the calling signals. The electrically operated device is then automatically switched by the processing circuit means to cause it to operate upon the validation of a predetermined number of such calling signals.

BRIEF DESCRIPTION OF DRAWINGS:

A preferred embodiment of the present invention will now be described with reference to the accompanying drawings in which.

DESCRIPTION OF PREFERRED EMBODIMENTS

Figures 1, 2, 5:
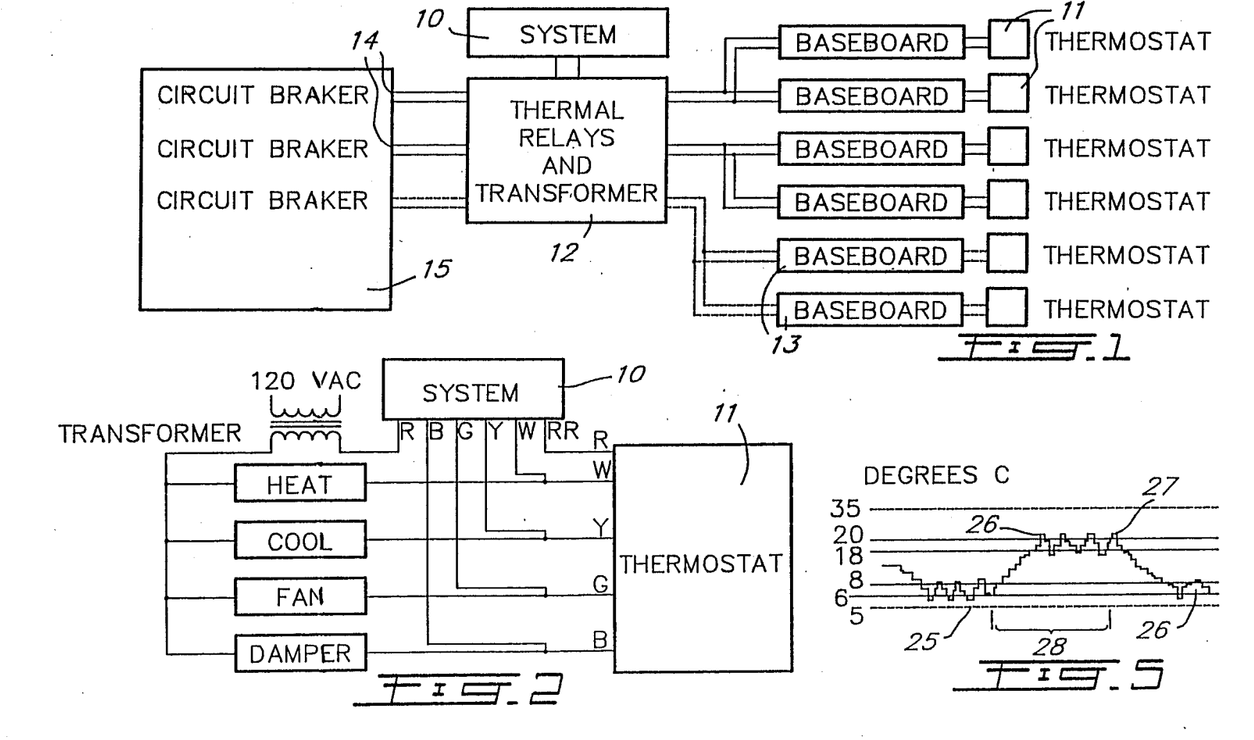
FIG. 1 is a block diagram showing a specific application of the switching system of the present invention.
FIG. 2 is a further block diagram showing another application of the switching system of the present invention.
FIG. 5 is a temperature graph showing the operation of the switching system of the present invention for controlling temperature conditioning device(s)

Referring now to FIGS. 1 and 2 there is shown two specific applications of the switching system 10 of the present invention. As herein shown, the switching system of the present invention is connected across the existing thermostat 11 of a heating or air conditioning system, and may be connected, as shown in FIG. 1, to power relays 12 which interconnect various electric heating elements 13 to the electrical power distributed by the switches 14 in a distribution panel 15. Thus, the switching system 10 can connect electrical power to any one of the electric base board heaters 13 upon detection of specific coded signals, as will be described later. As shown in FIG. 2, the switching system is connected to the various functions of a heat pump and can operate all functions or individual ones, as may be selected by the switching system. As herein shown, the switching system 10 is connected to the heating, cooling, the fan and the damper functions of the heat pump.

Before describing the specific construction of the switching system 10 of the present invention, we will firstly describe how the switching system is remotely controlled by the use of local or long distance telephone lines without transmitting voice signals along these lines, but by utilizing the calling sounds generated by a telephone being called by a user in a predetermined manner. Firstly, it is necessary for the user to adjust the switching system of the present invention to make sure that it receives the telephone signals generated by his telephone. This is done by placing a function switch on the system to an "absence" position, and making the telephone operate so that the user can determine visually and/or audibly if the switching system is receiving the telephone calling signals. The particular embodiment herein described deals with calling sound signals generated by a telephone, although the invention is not restricted thereto and can also process other types of signals that may be generated by a telephone.

Figure 3A:
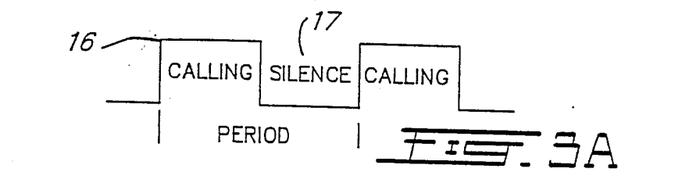
FIGS. 3A, 3B, 3C, 3D and 3E are pulse signals illustrating the manner in which the pulses are detected and validated, and illustrating the presence of different noise signals therein.

We will now describe the method utilized to remotely command the switching system to switch an electrically operated device. In accordance with communications regulations, in at least parts of North America, the minimum time interval of a ringing sound or a silent sound between two ringing sounds is 1 second, and a ringing sound between two silence periods must be inferior to 5 seconds. This specification is fairly well respected when one considers private telephone lines, as is quite common nowadays. However, with party-type telephone lines this regulation is not always followed. Accordingly, in order for the switching system of the present invention to operate with either private lines or party lines, the system must be able to recognize different calling signals, and therefore must analyze the sound period as well as the period of silence in the signals. Herein we consider the sum of the sound period and the silence period which follows as being "a period". This period will be analyzed as having a duration time of 7 seconds maximum, that is to say, 5 seconds maximum for the delay between two silence periods and 1 second maximum for the silence period and a 1-second tolerance. This period is illustrated in FIG. 3A.

The switching system of the present invention utilizes a microprocessor circuit (see FIG. 12), as will be described later, to measure the duration time of a ringing or calling sound 16 and the duration time of the silence 17. If both these time periods meet certain predetermined conditions, they will be stored and later counted as a single "period". If not, they will be simply rejected by the system. It is by analyzing the "periods" and by counting those that are rated as valid that the processing circuit will make a decision to control various circuits associated therewith to effect a required predetermined function. Accordingly, the switching system 10 will effect a function when the validated "periods" fall within a predetermined count or range.

Figure 4:
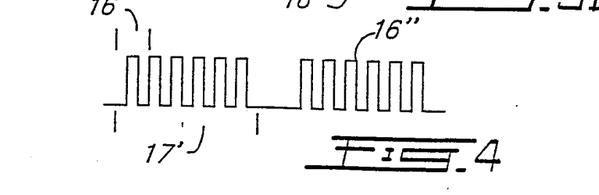
FIG. 4 is an illustration of the calling signal code.

In order for the microprocessor to analyze the calling signals 16 and 17 generated by the telephone device, the user must call a specific telephone number and make the telephone ring a code, as shown in FIG. 4. The code illustrated consists of six ring periods 16', terminated for a predetermined period of time 17', and then the same telephone number is called again and a second series of telephone rings 16" are caused to take place. The microprocessor will not consider the last calling sound generated by the telephone in both series of rings, as that period will be followed by a very long period of silence unless and very unlikely, another person happens to call a short time after the code of calling signals has been effected. The time delay between both series of rings must be in the range of from between 7 seconds to 90 seconds. Otherwise the command will not take place. The second series must be completed within the 90 seconds. The program or memory of the microprocessor can accumulate up to nine calling signals, and accordingly after storing nine calling signals the microprocessor can compare them, and it is only those signals 16 and 17 falling within 9/10 of a second, when compared between themselves, that will be considered as validated "periods". The "periods" which have time lapses outside the required range will be discarded. If the number of valid "periods" fall within the range of three to seven "periods", the call will be validated as a "command" signal.

Figure 3B:
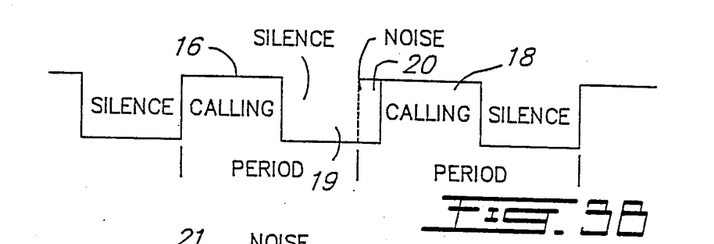
Figure 3C:
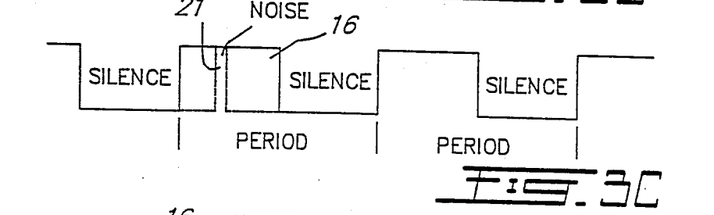

It is to be understood that the apparatus or system of the present invention operates in an environment which sometimes can have sounds or noises generated in the environment, such as household appliances i.e, refrigerators, door bells, the cracking of wood within the walls of a house, animals in close proximity, cars, immediate neighbors, etc. All of this random noise has very little chance of repeating itself within a short period of time or in an organized manner, but can be produced, while the telephone is generating calling signals to form a "command" signal. However, this random noise can produce a problem for the system an must be eliminated. FIGS. 3B to 3C illustrate the various effects of such noise.

If the noise occurs between two ringing sounds, the processing circuit will eliminate all noise signals having a duration time which is less than 9/10 of a second as with the calling signals. Also, in view of the above mentioned characteristics of the "period" that we are measuring, all sound signals having a duration of more than 6 seconds will also be eliminated (5 seconds being the maximum time of a sound signal plus one 1 second silence and tolerance). In any event, parasitic noise can occur between two ringing periods 16 or during the silence interval 17. As shown in FIG. 3B, when a noise signal 20 occurs before a ringing period 18 it can lengthen the actual ringing period 18, and shorten the preceding silence period 19, see reference numeral 19. If the noise signal 20 has a duration time which is superior to the programmed tolerance of a system, both periods 18 and 19 will be rendered invalid.

Figure 3D:
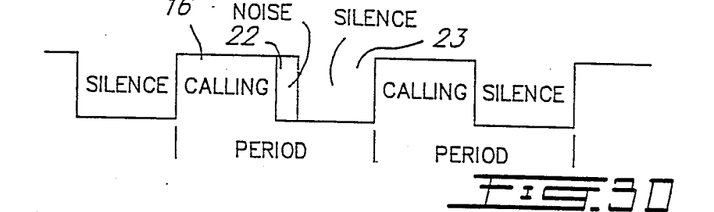
Figure 3E:
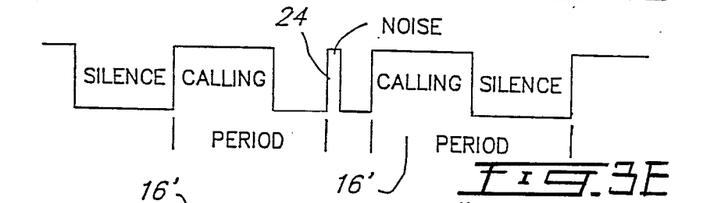

As shown in FIG. 3C, if the parasitic noise signal 21 occurs during a ringing period 16, it will have no effect on the decision being taken by the processing circuit. If a parasitic noise signal 22 occurs immediately after the ringing period 16, as shown in FIG. 3D, it will prolong the duration or lapse time of the ringing period and reduce the duration time of the silence period 23 that follows. In this particular instance, the "period" will be considered as a valid "period". If a parasitic noise signal 24 is spaced between two ringing periods, as shown in FIG. 3C, it reduces the preceding sound period 17 and renders it invalid if, and only if, the duration of the parasitic noise signal 24 is superior to 9/10 of a second and thus treated as a ringing period. The noise period 24 will also be rendered invalid by the second ringing period 16' when the silence period is evaluated as invalid.

In conclusion, there is only one case where the microprocessor can be affected in its decision, and that is when a noise signal takes place very closely in front of a ringing period 16, as shown in FIG. 3B. However, this is a very unlikely occurrence, but if it should arise, there will still be three other valid "periods" for the reason that the microprocessor would have eliminated two "periods" due to this parasitic noise and the last "period" automatically. The three remaining "periods" are sufficient for the calling "command" code to be validated to cause the switching system to effect a switching operation. The microprocessor has a program with four functions, and namely to store period signals, to calculate the number of period signals, to calculate if the valid periods constitute a command signal, and to effect the command.

The particular application of the system described herein is associated with a temperature conditioning device, and namely resistive heating elements, whereby to control the temperature in one or more areas being controlled by the switching system. FIG. 5 is a temperature graph illustrating the manner in which the temperature is controlled. In the absence of a command signal, the temperature is maintained within a low temperature range 25 of between 6° and 8° C. As soon as the temperature goes above 8° C., the heating system is cut off, and once it falls below 6° C., it is energized. As soon as a command signal is detected and validated, the heating system is turned "on" and the temperature is caused to rise to a high temperature range, herein set at 20° C. which is the high temperature limit of the system. This is illustrated at 26 in FIG. 5. Once the 20° C. is reached the system is "shut off" and turned "on" again as soon as the temperature falls below 18° C. This control process continues on for a predetermined period of time, herein a 2-hour period 28, and after this period lapse the heating elements are no longer energized and the temperature starts falling. The end of the period 28 is shown at 27 and the temperature drops down to its low level temperature control range 25, as illustrated at 26. If the occupant enters the space being heated within the delay period 28, before the end of the cycle 28, he can then place the switching system function switch to an "occupant" position, and with the use of the local thermostat select a desired temperature so that the thermostat can take over the control of the temperature heating device.

Two truth Tables are utilized to monitor the positive and negative variations in the ambient temperature with each truth table taking into account the 2°-differentials mentioned above and acting sometimes on the rise and sometimes on the fall of the temperature. These two truth Tables are set forth hereinbelow.

| TEMP | LT | HT | TEMP | LT | HT |
|---|---|---|---|---|---|
| ↑ 20 | 1 | 1 | ↓ 20 | 1 | 1 |
| ↑ 18 | 1 | 0 | ↓ 18 | 1 | 1 |
| ↑ 8 | 1 | 0 | ↓ 8 | 1 | 0 |
| ↑ 6 | 0 | 0 | ↓ 6 | 1 | 0 |
| ↑ 0 | 0 | 0 | ↓ 0 | 0 | 0 |

It can be observed that when the temperature is 0° C. a 1 condition does not appear in both truth Tables, and this is referred to as an impossible condition. If such a condition is read by the computer, the heating or air conditioning load would automatically be switched off. Not only does the program permit the reading of the temperature sensed by both comparators, it also stores the information by a last-in/first-out method keeping only temperature readings of the last twelve hours. When the program then analyzes the sounds emitted by the telephone generates a "command" signal to the control circuit of the program, the program will effect an averaging of the stored temperature information signal, and will take a decision as to whether it should actuate a heating device or an air cooling device. This decision is taken after considering the following three variables:
(a) after analyzing the series of ringing sounds of the telephone;
(b) after analyzing the average temperature stored in the processor; and
(c) after analyzing the actual temperature to determine if it is hot, cold or very cold.

This last decision is taken from analyzing the signal at the output of the comparators; and if the temperature is inferior to 6° C., the temperature is considered very cold, and if it varies between 8° and 18° C., it is considered cold; and if it is superior to 20° C., it is considered hot. As a security measure, the program will shut off the load supply as soon as it detects an error or an impossible condition. It can be appreciated that with the above established condition the microprocessor can decide if the electrical elements being controlled should be energized or deenergized. When considering the control of heating or air conditioning devices, the following switching decisions are made:

| HEATING | |
|---|---|
| SWITCHED OFF | SWITCHED ON |
| 1 impossible condition | 1 cold ambient temperature |
| 2 ambient average temperature and the delay is terminated | 2 delay period started and average ambient temperature and average cold temperture |
| 3 hot ambient temperature | 3 heating already energized and average ambient temperature |

| AIR CONDITIONING | |
|---|---|
| SWITCHED OFF | SWITCHED ON |
| 1 impossible condition | 1 hot ambient temperature and hot average temperature and delay has just terminated |
| 2 cold ambient temperature | |
| 3 slightly warm ambient temperature | |
| 4 delay terminated | 2 hot ambient temperature and delay has initiated |
| | 3 average cold temperature and delay initiated when condition 2 has been met |

It is pointed out that the air conditioning is not energized or switched on when the ambient temperature is above 20° C. It is necessary that the 2-hour delay be expired. However, the heater is energized or switched on as soon as the temperature goes under 6° C., and this is done for safety reasons to prevent water pipes from freezing, and to protect materials sensitive to low temperatures.

Figure 6:
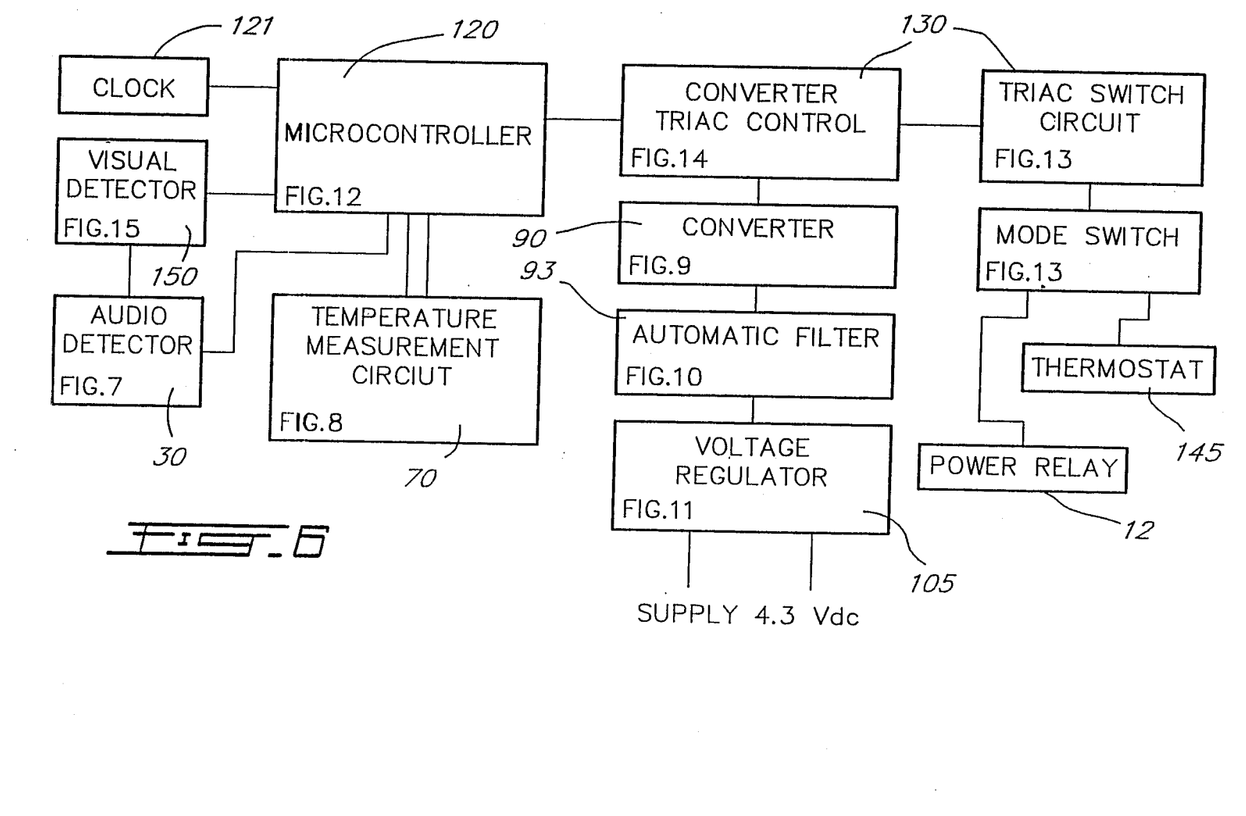
FIG. 6 is an interconnecting block diagram showing the interconnection of the various schematic diagrams illustrated in FIGS. 7 to 14 and forming the system of the present invention.

The specific construction of the switching system 10 of the present invention will be described in detail with reference to FIGS. 7 to 15. FIG. 6 is simply a block diagram showing the interconnection of the various circuits of FIGS. 7 to 15 which constitute the switching system 10 of the present invention.

Figure 7:
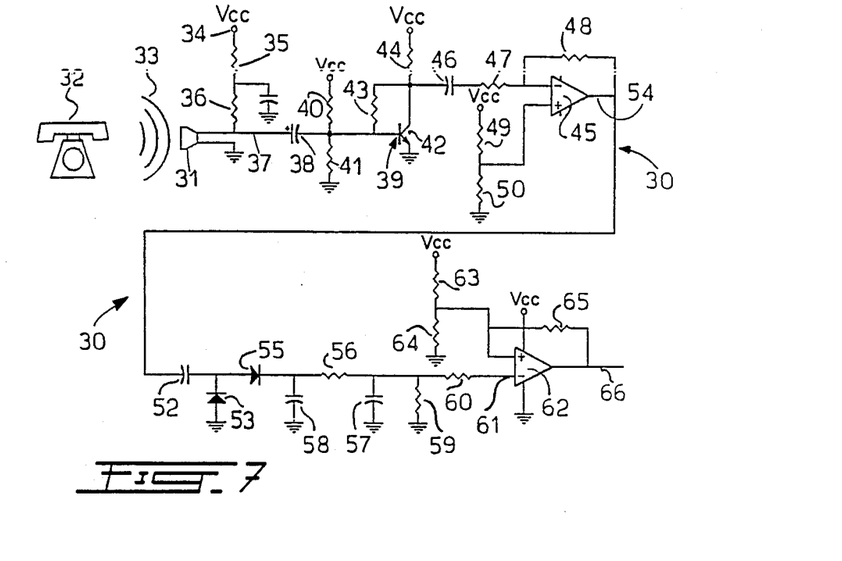
FIG. 7 is a schematic diagram of the audio detector circuit.

Referring now to FIG. 7, there is shown the specific construction of the audio detector circuit 30. It consists of a receiver device, herein a microphone 31, which receives the sound signals 33 from a telephone receiver device 32. A voltage supply 34 is applied to the terminals of the microphone 31 through resistances 35 and 36 and the signal at the output 37 of the microphone 31 is then filtered by capacitor 38 in order to obtain a voltage signal substantially free of noise. Such a signal is desired for amplification through high gain amplifiers. This weak intensity signal is coupled to the preamplifier circuit 39. Transistor 42 is biased by resistors 40 and 41 and connected to the base of transistor 42. The operating potential and the gain of transistor 42 is established by the feedback resistor 43 connected to the base/collector of the transistor. The maximum current that will pass through the collector/emitter of the transistor is determined by resistor 44.

A high gain amplifier 45 is connected to the output of a preamplifier and it operates by a simple polarity supply. The coupling between the preamplifier and the high gain amplifier 45 is effected through capacitor 46. Resistor 47 connected in series with capacitor 46 limits the level of the high frequency noise generated by the components of the circuit. The gain of the amplifier 45 is fixed by resistor 48 and input resistance 47. The level at the input is established by resistors 49 and 50 connected to the non-inverted input 51 of the operational amplifier 45. Thus, the output signal will be dependent upon this potential.

In order to establish comparison means it is necessary to treat the audio signal to make it compatible to a DC voltage. Accordingly, the level of the signal at the output of the operational amplifier is established by capacitor 52 and diode 53 whereby the AC signal at the output 54 of the operational amplifier 45 will be above 0.7 Vdc as set by diode 53. The signal is then integrated by diode 55, resistor 56, and capacitor 57. Capacitor 58 eliminates noise in the signal created by the change of state of the diodes 55 and 53. Resistor 56 and capacitor 57 eliminates all pulse signals having a duration time which is inferior to the time constant of this RC circuit. Also, when capacitor 57 is charged, and there are no pulse signals, it will discharge itself in resistor 59. Thus, the circuit provides a pulse having a duration time which is longer than the RC time constant of resistor 56 and capacitor 57, and which will have a minimal time duration equal to the time constant of resistor 59 and capacitor 57. Resistor 60 connects the signal to the inverted input 61 of operational amplifier 62. This resistance 60 corrects the input current as a function of the type and characteristic of the operational amplifier 62. The reference is established by resistors 63 and 64. Feedback resistor 65 establishes the hysteresis of the amplifier with resistors 63 and 64. Thus, in the absence of pulse output of the comparator will be maintained high. Each time that an input pulse exceeds the reference signal, the output 66 will be switched to a low level and the reference will drop down to a low hysteresis through resistor 65. It is only after the input signal at the input 61 falls below this reference signal that the signal on the output 66 will reset at a high level.

Figure 8:
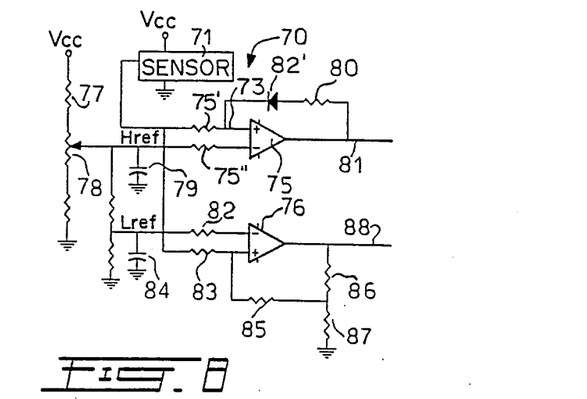
FIG. 8 is a schematic diagram of the temperature measuring circuit.

Referring now to FIG. 8, there is shown the construction of the temperature measuring circuit 70. It consists of a temperature transducer 71 of a type well known in the art, wherein a 10 mV output signal is provided for every degree Fahrenheit sensed by the transducer 71. The output 72 of this transducer is connected to the input 73 and 74 of comparators 75 and 76, respectively. The operation of comparator 75 is set at a high level by resistors 77 and 78. The reference voltage from the resistors 77 and 78 as well as from the sensor 71 are fed to the comparator 75 through resistors 75' and 75'', respectively, which corrects the input currents of the comparator 75 dependent on the type of operational amplifier used for the comparator. Capacitor 79 filters any noise that could be present in this reference signal. The hysteresis for the operational amplifier 75 is established by feedback resistor 80. Thus, the output of comparator 75 will be maintained at a low level as long as the output voltage of the transducer 71 does not exceed the reference level of the operational amplifier. When the output signal of the transducer exceeds the reference signal, the signal at the output 81 of the comparator 75 will rise to its high level until the output signal of the transducer drops below the reference level, less the hysteresis. Diode 82' completes the coupling of the resistor 24 to the input 73 of the operational amplifier.

The other comparator 76 or operational amplifier acts as a low level comparator. The reference and sensor voltages are connected to the comparator through resistors 82 and 83 respectively, and this circuit operates similarly to the other comparator, but for low level or low temperature detection. Capacitor 84 suppresses the noise on this reference signal. The hysteresis or circuit is herein connected to the other terminals of the operational amplifier, in reverse, and is provided by a voltage divider constituted by resistors 85, 86 and 87. The output of the comparator 76 will be maintained high until the output signal at the output 72 of the transducer 71 becomes inferior to the reference level. If the output of the transducer 71 becomes inferior to this reference, the signal on the output 88 of the comparator 76 will be placed at a low level, and will increase to a high level only when the output signal of the transducer rises to a level which is superior to the reference level plus the hysteresis. The result of the control action of the low level comparator is shown at 25 in FIG. 5. The control of the high level comparator is shown in the same Figure in the region between reference numerals 26 and 27.

Figure 9:
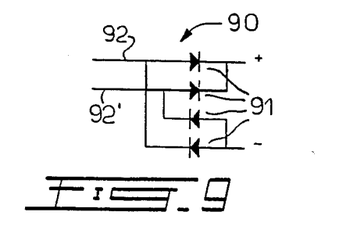
FIG. 9 is a schematic diagram of the converter.

Referring now to FIG. 9, there will be described the construction of the converter circuit 90 forming part of the power supply. As herein shown, the converter is provided by a diode bridge consisting of four diodes 91 whereby to convert the AC voltage into a DC voltage. The alternating voltage is tapped from the output connections 92 and 92' across a triac, as will be described with reference to FIG. 13. The negative side of the diode bridge constitutes the ground potential for the circuit, and the positive output is connected to the input of an automatic filter circuit, as shown in FIG. 10.

Because there are two possible supplies across the triac device, dependent on the state of the switching system, it is important to maintain the system supply voltage to the lowest possible current level whereby not to consume much power when the system is in a switching mode. Accordingly, care must be taken not to introduce large filtering capacitors in the power supply. In this automatic filter circuit 93 a small capacitance 94 will provide the minimum necessary filtration when the system is in à non-switching mode. However, when the system is in a switching mode where the voltage across the converter bridge 90 is of the order of 7V DC, it is necessary to filter this voltage signal in a more serious manner whereby to maintain a constant supply output voltage of 4.2V DC. In order to achieve this filtration, a circuit 95 is provided to detect the potential drop at the output of the diode bridge, and to provide a large capacitance across capacitor 94 . Resistors 96 and 97 form a voltage divider the value of which is calculated so that transistor 98 conducts when the potential at the output of the bridge 90 falls below 10V DC. Resistor 99 limits the current in the collector/emitter of transistor 98 and supplies the base/emitter current necessary for the conduction of transistor 100 which in turn polarizes the base of transistor 101. This polarizing current is set by resistor 102. Transistor 101 now acts as a switch and connects capacitance 103 in parallel with capacitance 94, thus increasing the filtering capacity of the circuit 95. Diode 104 provides the supplementary 0.7V DC and improves the charging of capacitance 103 when placed in operation.

Figures 10, 11:
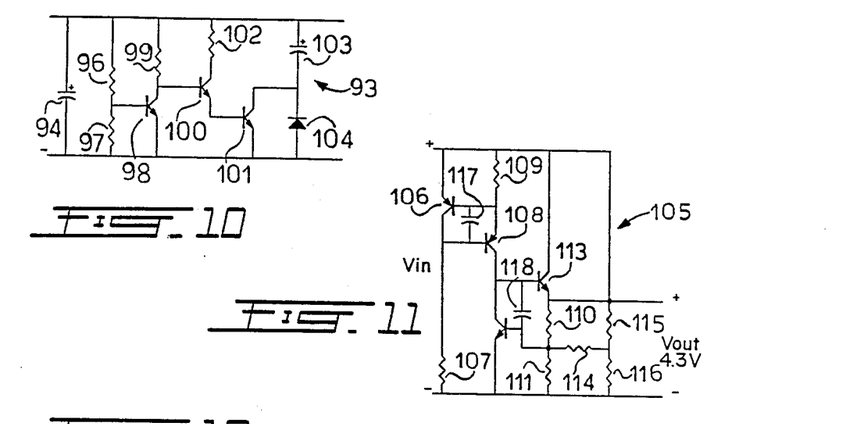
FIG. 10 is a schematic diagram of the automatic filter.
FIG. 11 is a schematic diagram of the voltage regulator.

Referring now to FIG. 11, there is shown the regulator output circuit 105 of the power supply. It comprises an asymmetric circuit connection of transistor 106, resistor 107, transistor 108, and resistor 109, which circuit assures a stable current for the reference voltage established by resistors 110, 111 and transistor 112. Transistor 112 corrects and maintains the potential between the emitter and ground connection of transistor 113 by modifying the current on the base of transistor 113. Resistors 114, 115 and 116 constitute a correction circuit which provides for a constant potential in either of the two modes of operation of the switching system. A variable potentiometer could also be placed between resistors 110 and 111 to correct the level of the output voltage. The capacitors 117 and 118 prevent the circuit from oscillating.

As can be observed from the above circuit descriptions, the power supply circuit is connected to the supply, the load and the power supply circuit are connected in series. The only location in the circuit where a supply can be obtained is across the switching element, herein the triac or switching relay. Accordingly, there are two modes of supply and that is when the triac conducts high voltage supply and when it does not conduct a low voltage supply. However, in conditions where the triac does not conduct, the current supply should be maintained as low as possible in order not to actuate the load, herein the electrically operated device which is connected in series with the triac. Thus, the power supply circuit and the construction of its filter is an important part of the system of the present invention.

Figure 12:
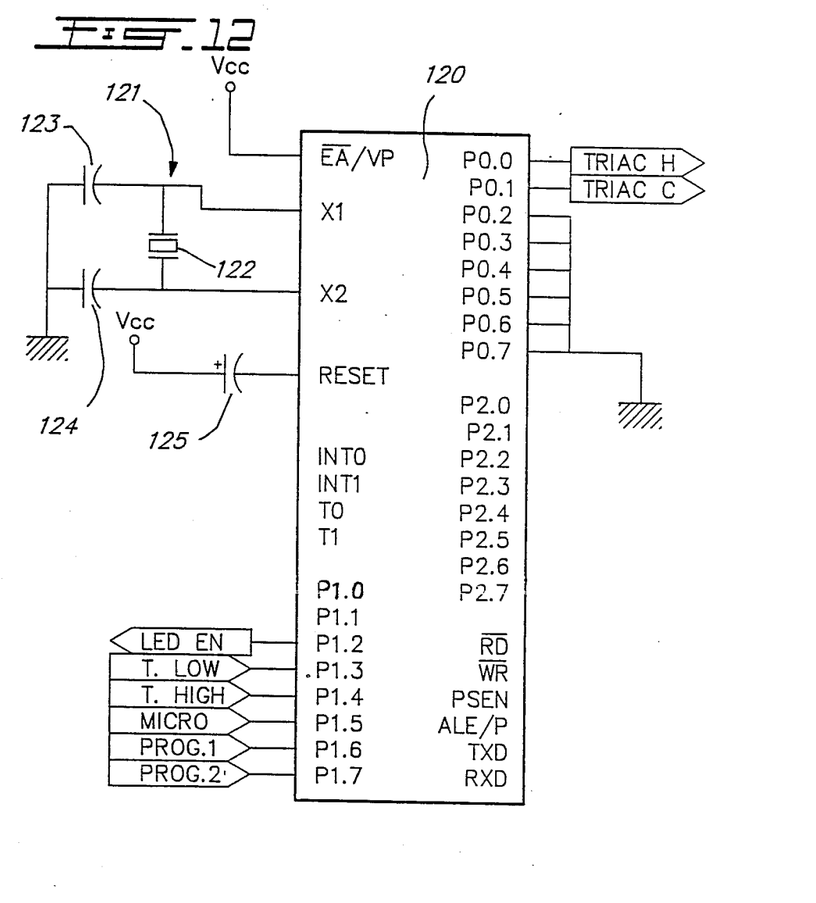
FIG. 12 is a pin block diagram of the microprocessor.

Referring now to FIG. 12, there is shown the pin circuit connections of the microprocessor/controller circuit 120. This controller includes the programs to analyze the telephone sound signal and to analyze the temperature control signals of the temperature control circuit 70. It is also provided with a clock circuit 121 including a crystal oscillator 122 and two small capacitances 123 and 124. The oscillator generates a frequency of 3.57945 mHz. This frequency was selected in the light of a low current consumption of the system taking into consideration that the execution speed of the system need not be very high for the intended applications of the system. An initializing circuit is formed by capacitor 125 and an internal resistance (not shown) to generate a pulse when the system is switched to "on". An inlet port will be utilized to effect the transaction between the various control circuits or signal generators.

Figure 13:
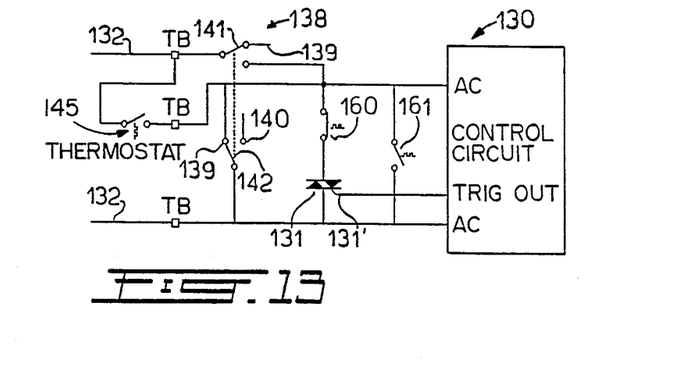
FIG. 13 is a schematic diagram illustrating the triac switch and protective mechanical switches.
Figure 14:
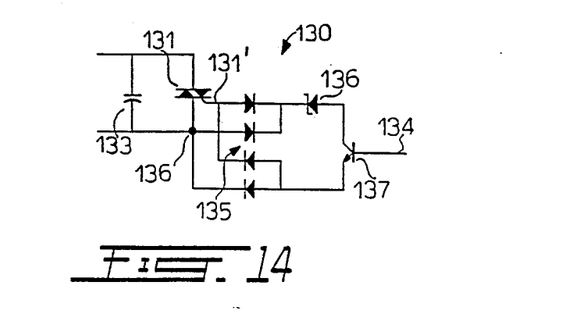
FIG. 14 is a schematic diagram of the converter circuit which feeds the control signal to the triac.

Referring now to FIGS. 13 and 14, there will be described the construction of the switching circuit 130. As previously described, the switching circuit is comprised of a triac 131 that will switch the necessary charge or voltage supply for the operation of power relays 12, as shown in FIG. 1. This switching voltage of 7 volts is connected across the output terminals 30, 132 which connect to the power relays. A capacitor 133 filters the noise in the electrical supply line and that generated by the switching devices. The triac 131 is controlled by the microcontroller 120, and more particularly by the control voltage on the output line 134. This control voltage is connected to the trigger 131' of the triac through the voltage rectifier formed by the diode bridge 135 which is connected between the trigger connection 131' and the connection 136 of the triac. Thus, when a signal is applied to the base of transistor 137 to polarize it, and if the potential between the terminal 136 and the trigger is superior to the voltage of the Zener diode 136, a pulse will be placed on the trigger of the triac to place it in conduction until the end of the cycle. The triac will conduct again for the second cycle to create a voltage of 7.5V AC at its terminals, which potential will be connected also to the power supply, and namely to the input of the converter 90. This voltage is also supplied across the terminals 132 to actuate the power relays 12 (see FIG. 1). Switch 160 is a high temperature cut-out switch which will open once the temperature rises above 35° C. Switch 161 is a low temperature protection switch which will close when the temperature falls below 5° C. and close the switching circuit to energize the heating device.

Referring more particularly to FIG. 13, it can be seen that the switching circuit is also provided with a mode switch 138 having a "presence" position 139 and an "absence" position 140. As can be seen, the switch is provided with a double armature each having the two positions 139 and 140. In the "presence" position 139, the switching arm 142 will disconnect the switching system of the present invention and connect to the thermostat 145. The switching arm 141 will disconnect the triac from the terminals 132 and thus the power relays. In the "absence" position 140, switch arm 142 will switch out the thermostat and switch in the power system. Switch arm 141 will connect the triac or the command signal line to the power relays. In the "presence" position, the temperature control is provided by the thermostat 145, while in the "absence" position it is automatically provided by the microprocessor/controller.

Figure 15:
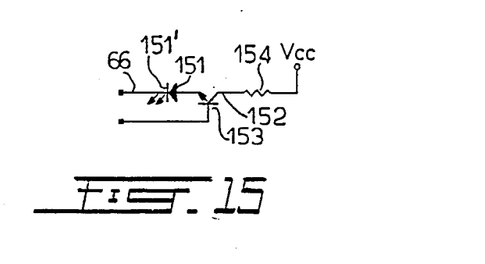
FIG. 15 is a schematic diagram of the signal pulse visual detector.

As shown in FIG. 15, the circuit also comprises a visual detector circuit 150 which is comprised essentially by a light emitting diode 151 connected to the output line 66 of the audio detector circuit 30. The light emitting diode is controllably a transistor 152, the base of which controls the passage of current through the light emitting diode of which the cathode 151' is connected to the output 66 of the audio detector 30. Resistor 154 controls the current in the collector/emitter of the transistor 152 and in the diode 151.

Summarizing briefly the operation of the switching system of the present invention, it comprises essentially in positioning the telephone in close proximity to the switching device of the present invention whereby the switching device receives audible sound signals emitted by the telephone device. The distance between the apparatus and the telephone device is detected by the LED 151, and this distance may vary by either increasing the intensity of the sound signals generated by the telephone or positioning the system consists in calling the telephone number associated with the device and making the telephone ring a code including a predetermined number of rings, herein six rings followed by a second series of telephone ring signals generated after a predetermined time delay after the first series of ringing calls. In this particular application, a minimum time delay of 5 seconds is necessary. The switching system has a processing circuit for identifying this code of calling signals and validating a predetermined number of these calling signals. After a predetermined number of these signals are validated the microprocessor automatically switches on an electrically operated device, such as base board heaters or a heat pump, etc. to cause it to operate. A temperature sensing circuit is associated with the microprocessor and sends information signals to the processor whereby the processor may control the temperature in the environment of the device to maintain the temperature at a predetermined low temperature range or a predetermined high temperature range. The high temperature range, in the particular application described, can be maintained for a predetermined period of time after a calling signal has been validated.

It is within the ambit of the present invention to cover any obvious modifications of the preferred embodiment described herein, provided such modifications fall within the scope of the appended claims. For example, it is conceived that the switching system of the present invention can have industrial applications, and in such applications it is also conceived that the ambient noise may be sufficient to make it difficult for the apparatus to detect audible telephone sounds from the noise. In such an application a direct connection can be made to the telephone line in order to detect the signals generating the audible sound. This direct electrical connection would also include an electrical signal detector capable of generating a square pulse signal wherein the high level of the signal would represent the time of the calling sound, and the low level would represent the time lapse of the silence period. The switching system of the present system can also be commanded by DTMF signals or by pulses. Therefore, the microcontroller may be provided with a DTMF decoder, a pulse detector to detect pulses created by the rotation of a wheel of a standard telephone, a sound generator, a sound signal detector as described hereinabove, or by an interface having a plurality of channels with command signals. A program can be developed to accommodate such modifications and may comprise password signals for programming the system from a remote position, a personal identification code, an address code for the loads, for selecting a switching mode, or a selected synch signal or flip-flop circuit, for obtaining stored information, for programming the system, or for controlling the various associated circuits such as a temperature control circuit. Thus, various modifications to the system as herein described are possible within the scope of the present invention.

I claim:

1. A switching system for switching an electrically operated device and wherein said switching system is operated by remote control using calling signals generated by a telephone, said switching system comprising switch means to enable said electrically operated device, processing circuit means for identifying said calling signals and operating said switching means upon accepting a specific code of said calling signals and validating a predetermined number of said calling signals, said electrically operated device being a temperature conditioning device, said switching system further comprising an ambient temperature measuring circuit for sensing a temperature in an enclosure and feeding temperature information signals to said processing circuit means for storage therein, said ambient temperature measuring circuit having two comparators each connected to a respective temperature responsive transducer generating an output voltage signal representative of the ambient temperature of said transducer, one of said comparators having a low temperature reference level and the other a high temperature reference level whereby to feed temperature control signals to said processing circuit means for storage therein, said stored temperature information signals being retained in said processing circuit means for a predetermined period of time, said stored temperature information signals being averaged by said processing circuit means when a command signal is received over said telephone, said processing means when receiving said specific code enabling said switching system to switch "on" a heating or cooling system of said temperature conditioning device dependent on the average value of said stored temperature information signals, to maintain the temperature in said enclosure at a predetermined low or high temperature range.

2. A switching system as claimed in claim 1 wherein said transducers have a tolerance of plus/minus 1° C., said low temperature reference level being fixed at 6° C. with a +2° C. differential during an "absence" system condition, said high temperature reference level being fixed at 20° C. with a −2° C. differential, said high temperature reference level being fixed for a predetermined time interval as determined by said processing circuit means upon receipt of said calling signals that are validated.

3. A switching system as claimed in claim 1 wherein said electrically operated device comprises a heat pump or a central heat/ventilating/air conditioning device, said switching system is connected between a thermostat device which operates said temperature conditioning device and said temperature conditioning device, and a mechanically operated switch to bypass said thermostat to connect said switching system to automatically control said temperature conditioning device.

4. A switching system as claimed in claim 1 wherein said specific code comprises a first series of repetitive calling sounds followed by a delay period and a second series of repetitive calling sounds.

5. A switching system as claimed in claim 4 wherein said processing circuit means is a microprocessor/controller circuit, said microprocessor/controller circuit analyzing each period of calling sounds to discriminate between valid periods and noise signals, each period consisting of a sound signal followed by a period of silence.

6. A switching system as claimed in claim 5 wherein said specific code comprises six repetitive calling sounds, said delay period being approximately a 5-second interval, said valid periods having a calling sound falling in the range of from 9/10 to 5 seconds and a period of silence falling in the range of 9/10 to 5 seconds, said calling signals that are validated falling in the range of from three to seven validated periods.

7. A switching system as claimed in claim 1 wherein said calling signals are calling sounds generated by said telephone, said switching system further comprising an audio detector circuit for detecting audio sounds of said calling signals and converting same into a signal recognizable by said processing circuit means.

8. A switching system as claimed in claim 7 wherein said audio detector circuit comprises an amplifier circuit connected to a microphone whereby to amplify sound signals received thereby, means to convert amplified sound signals to pulse signals, filtering circuit means for eliminating pulse signals falling below a predetermined time period, and for suppressing noise on accepted pulse signals.

9. A switching system as claimed in claim 8 wherein there is further provided indicating means for detecting the presence of said accepted pulse signals and generating an audio or visual signal indicating the presence thereof to provide an indication that said sound signals are being received by said switching device.

10. A switching system as claimed in claim 7 wherein said switch means is a switching circuit including a triac semiconductor switch, said triac permitting said switching circuit to supply a low voltage when conducting to supply a local power supply, said triac when not conducting supplying a high voltage to operate power relay(s) to switch on said electrically operated device, said triac being controlled by said processing circuit means, and a power supply connected across said triac.

11. A switching system as claimed in claim 10 wherein said local power supply comprises an AC to DC converter connected across said triac, said triac being connected in series with said switch means, an automatic filter circuit connected to an output of said converter and operable to maintain a constant low operating supply current to said switching system during a stand-by condition of the system without affecting said switch means, and a voltage regulator to maintain a steady supply voltage in both modes of operation of said triac.

12. A switching system as claimed in claim 10 wherein a high temperature cut-out switch is connected in series between said triac and a mechanically operated switch which enables said switching system and bypasses a thermostat device normally operating said electrically operated device whereby to cut out said high voltage operating said power relay(s) when the ambient temperature rises above a predetermined value.

13. A switching system as claimed in claim 12 wherein a low temperature enabling switch is connected in parallel with the series connection of said triac and high temperature cut-out switch whereby to enable said power relays when said ambient temperature falls below a predetermined value.

14. A switching system as claimed in claim 1 wherein said processing circuit means is a computer, said computer having a program to identify a code of calling signals validate individual calling signals, disregard noise signals and upon receipt of a predetermined number of validated calling signals perform a predetermined programmed function.

15. A switching system as claimed in claim 1 wherein said electrically operated device is a heat pump, said switch means operating code selected ones of a plurality of functions of said heat pump.

16. A method of remote switching an electrically operated device, said method comprising the steps of:
  (i) calling a predetermined telephone number of a telephone coupled to a switching system having processing circuit means to identifying a code of calling signals and validating a predetermined number of calling signals;
  (ii) causing said telephone to generate a first series of repetitive calling signals followed by a delay period and a second series of repetitive calling signals to cause said processing circuit means to validate said calling signals, each of said calling signals comprising a sound signal followed by a period of silence, said sound signal and period of silence constituting a period, said step of validating a predetermined number of calling signals further comprising:
    (a) measuring a time lapse of said sound signal in a period to determine if it lies within a predetermined time lapse;

(b) accepting a sound signal within said time lapse and rejecting others;
(c) measuring the duration of said period of silence; and
(d) storing only validated periods where said sound signal and following period of silence fall within predetermined time limits; and (iii) automatically switching said electrically operated device to cause it to operate whereby to regulate temperature in a sensed enclosure dependent upon an average value of stored sensed temperature signals and upon validating a predetermined number of said calling signals.

17. A method as claimed in claim 16 wherein said step (d) comprises storing a predetermined number of said validated periods in a memory on a first-in last-out basis, and effecting said step (III) by counting validated ones of said stored periods to determine if the count falls within a predetermined range.

18. A method as claimed in claim 16 wherein said electrically operated device is a temperature conditioning device, said switching means further including the steps of:
   (a) sensing ambient temperature in an enclosure associated with said switching device;
   (b) feeding temperature signals representative of said ambient temperature to said processing circuit means; and
   (c) storing said temperature signals.

19. A method as claimed in claim 18 wherein said step (a) comprises independently sensing a predetermined low or high temperature value and automatically operating said temperature conditioning device to substantially maintain said low or high temperature value depending on a desired temperature level.

20. A method as claimed in claim 19 wherein said step (a) further comprises automatically maintaining said high temperature value when reached upon effecting step (iii) and within a predetermined time period.

21. A method as claimed in claim 16 wherein said calling signals are telephone generated sound signals, and wherein there is provided the step of positioning said switching system relative to an associated telephone, and verifying that said system receives said sound signals.

22. A method as claimed in claim 21 wherein said verifying step consists in causing a lamp to light upon detection of an electrical signal representative of a received sound signal.

23. A method as claimed in claim 21 wherein said switching system performs the steps of:
   (a) detecting said sound signals by an audio detector;
   (b) amplifying said sound signals in said detector;
   (c) converting said amplified sound signals to pulse signals;
   (d) filtering pulse signals to remove pulses falling outside a predetermined time interval; and
   (e) feeding said pulse signals to said processing circuit means.

24. A method as claimed in claim 21 wherein said step (III) comprises:
   (a) feeding a controlling voltage to a switching circuit having a triac semiconductor device to condition the operation thereof, said triac when rendered non-conducting permitting a supply voltage to be connected to a power switching device to enable said electrically operated device.

25. A method as claimed in claim 24 wherein said switching circuit further comprises the steps of:
   (b) mechanically sensing a predetermined low ambient temperature; and
   (c) operating said power switching device when said predetermined low temperature is reached and including bypassing said triac.

26. A method as claimed in claim 25 wherein there is further provided the steps of:
   (d) mechanically sensing a predetermined high ambient temperature; and
   (e) disabling said power switching device when said predetermined high temperature is reached by disconnecting said triac.

27. A method as claimed in claim 21 wherein there is further provided the step of providing a steady state local power supply having a low voltage and low amperage irrespective of the fluctuation of an input voltage supply to said local power supply.

28. A switching system for switching a temperature conditioning device and wherein said switching system is operated by remote control using a telephone, said switching system comprising switch means to enable said temperature conditioning device, processing circuit means for operating said switch means, said switching system further comprising an ambient temperature measuring circuit for sensing the temperature in an enclosure and feeding temperature information signals to said processing circuit means for storage therein, said ambient temperature measuring circuit having two comparators each connected to a respective temperature responsive transducer generating an output voltage signal representative of the ambient temperature of said transducer, one of said comparators having a low temperature reference level and the other a high temperature reference level whereby to feed temperature control signals to said processing circuit means for storage therein, said stored temperature information signals being retained in said processing circuit means for a predetermined period of time, said stored temperature information signals being averaged by said processing circuit means when a command signal is received over said telephone said processing circuit means when receiving a specific code enabling said switching system to switch "on" a heating or cooling system of said temperature conditioning device dependent on the average value of said stored temperature information signals, to maintain the temperature in said enclosure at a predetermined low or high temperature range.

* * * * *